(12) United States Patent
Kim et al.

(10) Patent No.: US 8,085,871 B2
(45) Date of Patent: Dec. 27, 2011

(54) ADAPTIVE MODULATION IN A MULTIPLE INPUT MULTIPLE OUTPUT WIRELESS COMMUNICATION SYSTEM WITH OPTIONAL BEAMFORMING

(75) Inventors: Joonsuk Kim, San Jose, CA (US); Christopher J. Hansen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1766 days.

(21) Appl. No.: 11/244,518

(22) Filed: Oct. 6, 2005

(65) Prior Publication Data

US 2006/0239375 A1    Oct. 26, 2006

Related U.S. Application Data

(63) Continuation-in-part of application No. 11/168,793, filed on Jun. 28, 2005, now Pat. No. 7,738,583.

(60) Provisional application No. 60/673,451, filed on Apr. 21, 2005, provisional application No. 60/698,686, filed on Jul. 13, 2005.

(51) Int. Cl.
      *H04K 1/10* (2006.01)
(52) U.S. Cl. ................... 375/299; 375/260; 375/350
(58) Field of Classification Search ............. 375/299
      See application file for complete search history.

(56) References Cited

U.S. PATENT DOCUMENTS

| 2002/0187753 | A1* | 12/2002 | Kim et al. ............... 455/69 |
|---|---|---|---|
| 2004/0018818 | A1* | 1/2004 | Hottinen et al. ......... 455/78 |
| 2004/0042558 | A1* | 3/2004 | Hwang et al. ........... 375/267 |
| 2004/0171359 | A1* | 9/2004 | Tirkkonen et al. ..... 455/127.1 |
| 2005/0015589 | A1* | 1/2005 | Silverman et al. ...... 713/160 |
| 2005/0152473 | A1* | 7/2005 | Maltsev et al. ......... 375/299 |
| 2005/0276347 | A1* | 12/2005 | Mujtaba et al. ........ 375/299 |
| 2006/0098754 | A1* | 5/2006 | Kim et al. ............... 375/267 |
| 2006/0165191 | A1* | 7/2006 | Lin et al. ............... 375/267 |
| 2006/0176972 | A1* | 8/2006 | Kim et al. ............... 375/267 |

* cited by examiner

*Primary Examiner* — Shuwang Liu
*Assistant Examiner* — Michael Neff
(74) *Attorney, Agent, or Firm* — Garlick Harrison & Markison; Bruce E. Garlick

(57) ABSTRACT

A transmitting MIMO wireless device transmits a training sequence to a receiving MIMO wireless device. The receiving MIMO wireless device estimates a channel response based upon the training sequence, determines an estimated transmitter beamforming unitary matrix and a transmit path quality matrix, and then transmits some/all of these parameters to the transmitting MIMO wireless device. The transmitting MIMO wireless device receives these components and determines a modulation to be employed for each of a plurality of data streams. The transmitting MIMO wireless device transmits a data frame to the receiving MIMO wireless device that includes a short training sequence, a long training sequence, a signal field with demodulation control signals, and a data payload for each of multiple data streams. According to one embodiment of the signal field, the signal field indicates a number of data streams of the data frame and a modulation employed for each data stream. The signal field may include additional information, such as whether beamforming is employed for the data frame.

14 Claims, 10 Drawing Sheets

| Configuration | CONs | LEN | LPI | Clsd | RSVD | CRC | TAIL |
|---|---|---|---|---|---|---|---|
| 952 | 954 | 956 | 958 | 960 | 962 | 964 | 966 |

ADAPTIVE MODULATION IN A MULTIPLE INPUT MULTIPLE OUTPUT WIRELESS COMMUNICATION SYSTEM WITH OPTIONAL BEAMFORMING

CROSS REFERENCES TO RELATED APPLICATIONS

This application is a continuation-in-part of U.S. Utility application Ser. No. 11/168,793, filed Jun. 28, 2005 which claims priority to U.S. Provisional Patent Application Ser. No. 60/673,451, filed Apr. 21, 2005. This application also claims priority to U.S. Provisional Patent Application Ser. No. 60/698,686, filed Jul. 13, 2005, all of which are incorporated herein by reference for all purposes.

BACKGROUND OF THE INVENTION

1. Technical Field of the Invention

This invention relates generally to wireless communication systems and more particularly to Multiple Input Multiple Output (MIMO) wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

To further improve wireless communications, transceivers may incorporate beamforming. In general, beamforming is a processing technique to create a focused antenna beam by shifting a signal in time or in phase to provide gain of the signal in a desired direction and to attenuate the signal in other directions. In order for a transmitter to properly implement beamforming, it needs to know properties of the channel over which the wireless communication is conveyed. Accordingly, the receiver must provide feedback information for the transmitter to determine the properties of the channel. The feedback information may be sent as a receiver determined beamforming matrix (V) if singular value decomposition can be determined or it may be sent as a channel matrix (H). Prior art papers relating to beamforming include: (1) Digital beamforming basics (antennas) by Steyskal, Hans, Journal of Electronic Defense, Jul. 1, 1996; (2) Utilizing Digital Downconverters for Efficient Digital Beamforming, by Clint Schreiner, Red River Engineering, no publication date; and (3) Interpolation Based Transmit Beamforming for MIMO-OFMD with Partial Feedback, by Jihoon Choi and Robert W. Heath, University of Texas, Department of Electrical and Computer Engineering, Wireless Networking and Communications Group, Sep. 13, 2003.

The transmitter receives the estimated channel matrix (H) or the receiver determined beamforming matrix (V) as feedback to adjust the transmit beamforming processing. However, such information is not used to optimize data throughput by adjusting per channel and/or per subcarrier modulation scheme. Further, no mechanism exists for cooperative operation between the transmitter and receiver in this regard. Therefore, a need exists for the optimization of data throughput of a MIMO and/or MISO wireless communication.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 10 is a block diagram illustrating one embodiment of a signal field constructed according to an embodiment of the present invention.

DETAILED DESCRIPTION OF THE INVENTION

Figure 1:
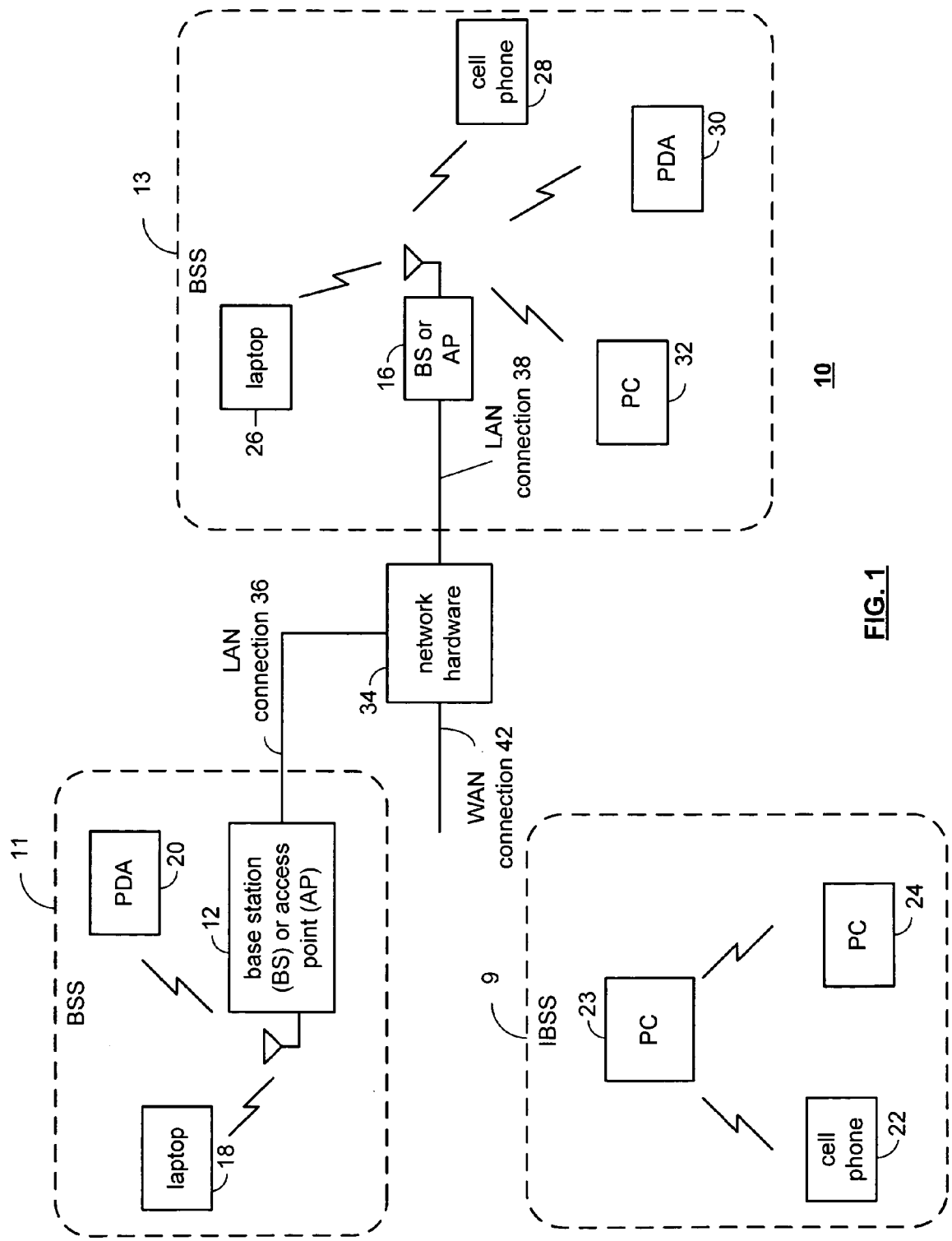
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera, provides a wide area network connection 42 for the communication system 10. Further note that the wireless communication devices 18-32 may be laptop host computers 18 and 26, personal digital assistant hosts 20 and 30, personal computer hosts 24 and 32, and/or cellular telephone hosts 22 and 28. The details of the wireless communication devices will be described in greater detail with reference to FIGS. 2 and/or 3.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
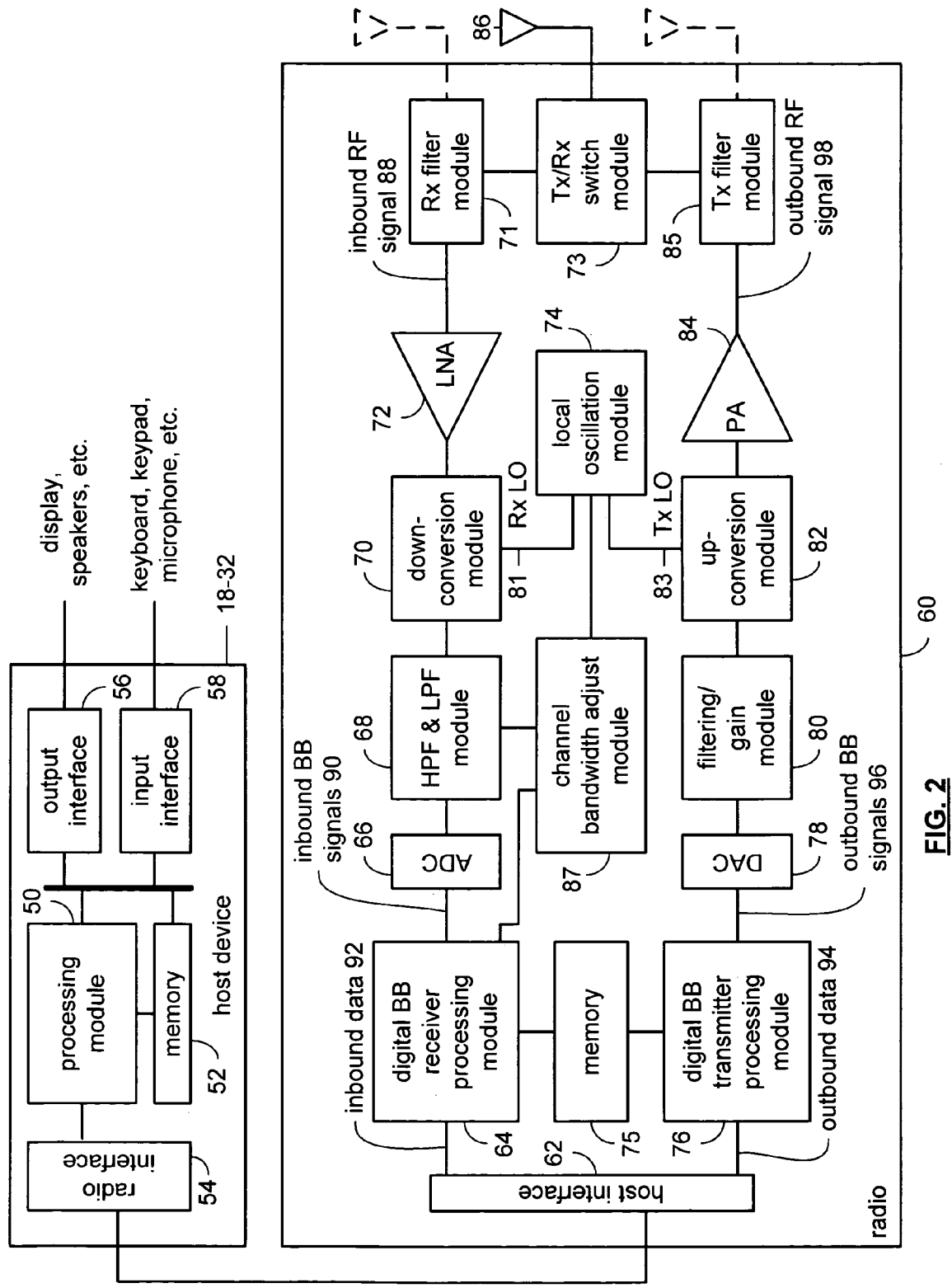
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a high pass and low pass filter module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a channel bandwidth adjust module 87, and an antenna 86. The antenna 86 may be a single antenna that is shared by the transmit and receive paths as regulated by the TX/RX switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce outbound baseband signals 96. The outbound baseband signals 96 will be digital base-band signals (e.g., have a zero IF) or a digital low IF signals, where the low IF typically will be in the frequency range of one hundred kilohertz to a few megahertz.

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point, and/or another wireless communication device.

The radio 60 also receives inbound RF signals 88 via the antenna 86, which were transmitted by a base station, an access point, or another wireless communication device. The antenna 86 provides the inbound RF signals 88 to the receiver filter module 71 via the TX/RX switch 73, where the RX filter 71 band pass filters the inbound RF signals 88. The RX filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters, based on settings provided by the channel bandwidth adjust module 87, the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kilohertz to a few megahertz. The digital receiver processing module 64, based on settings provided by the channel bandwidth adjust module 87, decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
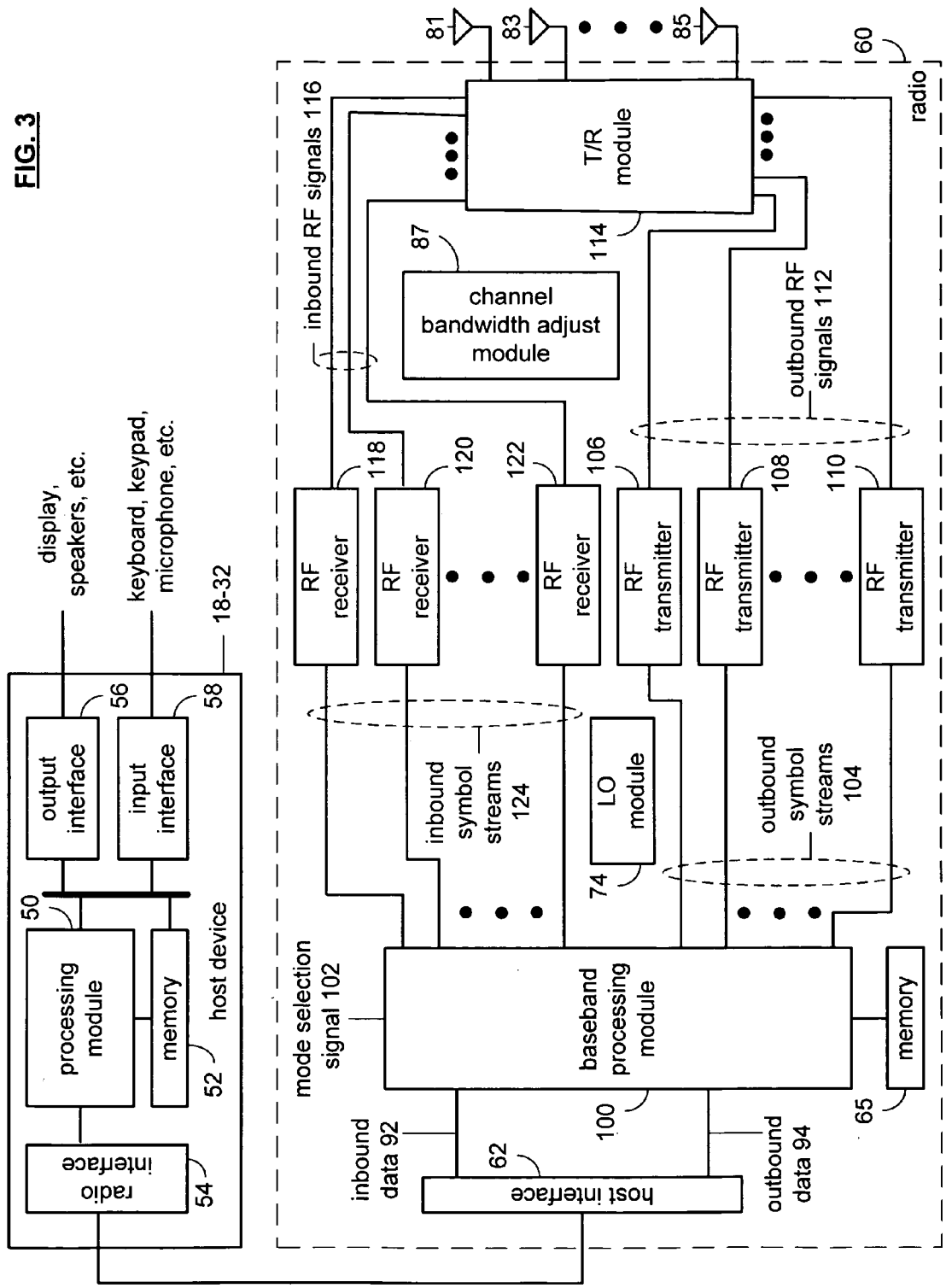
FIG. 3 is a schematic block diagram of another wireless communication device in accordance with the present invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58, and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM, 64 QAM and/or 256 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3, or 4 antennas, the baseband processing module 100 will produce 2, 3, or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency band pass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122, which will be described in greater detail with reference to FIG. 4. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
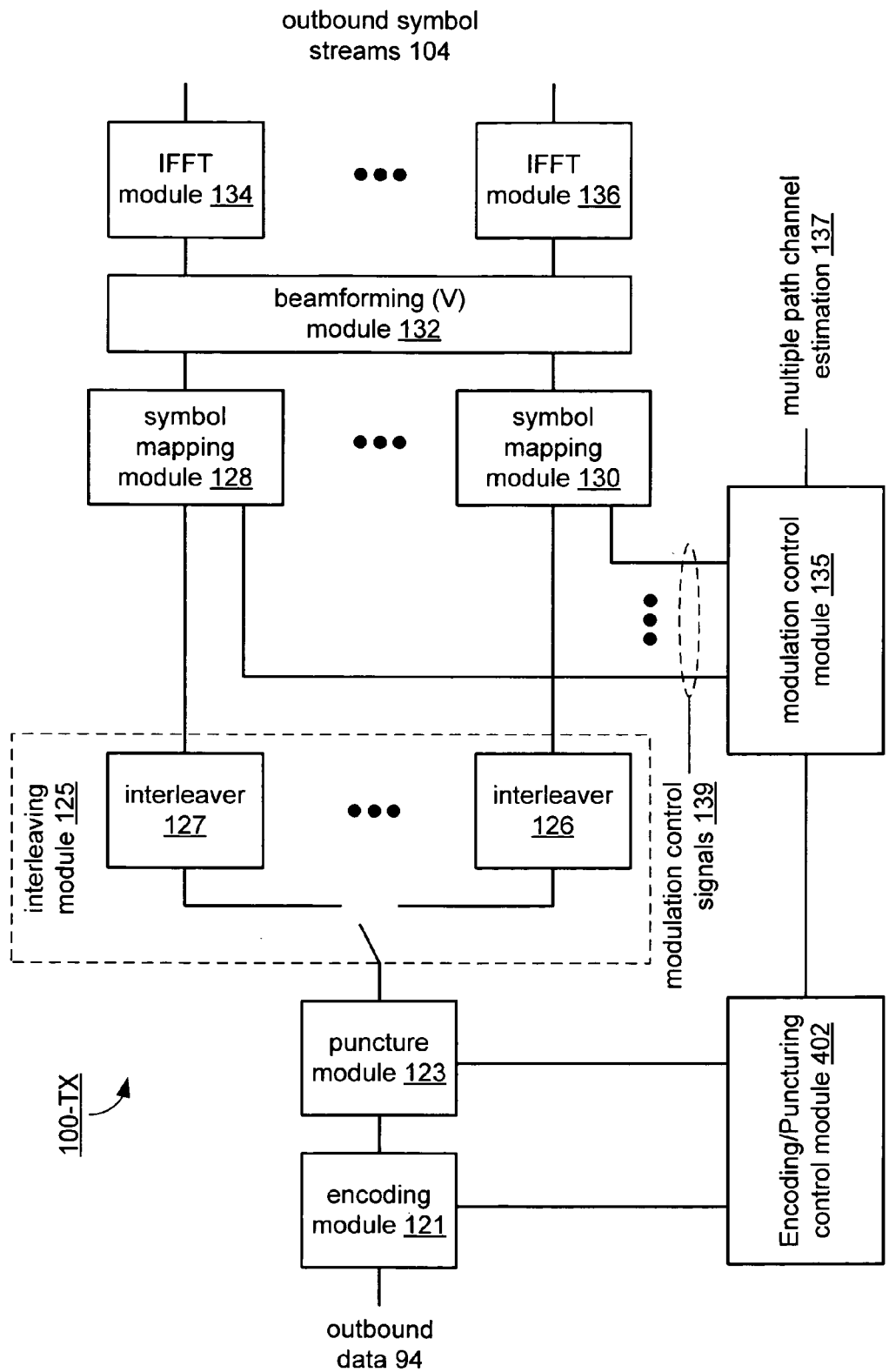
FIG. 4 is a schematic block diagram illustrating baseband transmit processing in accordance with the present invention.

FIG. 4 is a schematic block diagram of baseband transmit processing 100-TX within the baseband processing module 100, which includes an encoding module 121, a puncture module 123, an interleaving module 125, a plurality of symbol mapping modules 128, 130, a beamforming module (V) 132, a modulation control module 135, and a plurality of inverse fast Fourier transform (IFFT) modules 134, 136 for converting the outbound data 94 into the outbound symbol stream 104. In one embodiment, the interleaving module 125 includes a switching module and a plurality of interleavers 127, 126. As one of ordinary skill in the art will appreciate, the baseband transmit processing 100-TX may include two or more of each of the interleavers 127, 126, the symbol mapping modules 128, 130, and the IFFT modules 134, 136, wherein the number of each module corresponds to the number of transmit paths of a MIMO wireless communication. In addition, one of ordinary skill in art will further appreciate that the encoding module 121, puncture module 123, the interleavers modules 127, 126, the symbol mapping modules 128, 130, and the IFFT modules 134, 136 may be function in accordance with one or more wireless communication standards including, but not limited to, IEEE 802.11a, b, g, n.

In one embodiment, the encoding module 121 is operably coupled to convert outbound data 94 into encoded data in accordance with one or more wireless communication standards. The puncture module 123 punctures the encoded data to produce punctured encoded data. According to one aspect of the present invention, an encoding/puncturing control module 402 is operable to selectively encode and puncture outbound data 94 based upon the stream that will carry the data. The encoding/puncturing of data 94 based upon its carrying stream may be controlled in cooperation with the constellation size and mappings performed by the symbol mapping modules 128 and 130 as controlled by the modulation control module 135, as described further below.

The plurality of interleavers 127, 126 is operably coupled to interleave the punctured encoded data into a plurality of interleaved streams of data. The plurality of symbol mapping modules 128, 130 is operably coupled to map the plurality of interleaved streams of data into a plurality of streams of data symbols based on a plurality of modulation control signals 139 provided by the modulation module 135. The beamforming module 132 is operably coupled to beamform, using a unitary matrix having polar coordinates, the plurality of streams of data symbols into a plurality of streams of beamformed symbols. The plurality of IFFT modules 124, 136 is operably coupled to convert the plurality of streams of beamformed symbols into a plurality of outbound symbol streams.

The beamforming module 132 is operably coupled to multiply a beamforming unitary matrix (V) with baseband signals provided by the plurality of constellation mapping modules 128, 130. The beamforming unitary matrix V used by the beamforming module 132 satisfies the conditions of "$V^*V=VV^*=I$", where "I" is an identity matrix of [1 0; 0 1] for 2×2 MIMO wireless communication, is [1 0 0; 0 1 0; 0 0 1] for 3×3 MIMO wireless communication, or is [1 0 0 0; 0 1 0 0; 0 0 1 0; 0 0 0 1] for 4×4 MIMO wireless communication. In this equation, $V^*V$ means "conjugate (V) times V" and $VV^*$ means "V times conjugate (V)". Note that V may be a 2×2 unitary matrix for a 2×2 MIMO wireless communication, a 3×3 unitary matrix for a 3×3 MIMO wireless communication, and a 4×4 unitary matrix for a 4×4 MIMO wireless communication. Further note that for each column of V, a first row of polar coordinates including real values as references and a second row of polar coordinates including phase shift values. Of course, the beamforming unitary matrix may V may be expressed in Cartesian coordinates as well.

In one embodiment, the symbol mapping modules 128, 130 function in accordance with one of the IEEE 802.11x standards to provide an OFDM (Orthogonal Frequency Domain Multiplexing) frequency domain baseband signals that includes a plurality of tones, or subcarriers, for carrying data. Each of the data carrying tones represents a symbol mapped to a point on a modulation dependent constellation map. For instance, a 16 QAM (Quadrature Amplitude Modulation) includes 16 constellation points, each corresponding to a different symbol. The particular modulation scheme used on a per transmit path (stream) basis, on a per subcarrier basis, and/or a combination thereof is dictated by the modulation control module 135 via the modulation control modules. For example, if the modulation scheme is adjusted on a per transmit path basis, the modulation control module 135 may determine that one transmit path will use a 16 QAM modulation scheme, while another may use a 64 QAM modulation scheme, and yet another transmit path may use a QPSK modulation scheme. As another example, if the modulation scheme is adjusted on a per subcarrier basis, each sub carrier of each transmit path may have a different modulation scheme. For instance, some subcarriers may have a 16 QAM modulation scheme, while others may use a 64 QAM modulation scheme, and some others may use a QPSK modulation scheme.

The modulation control module 135 determines the modulation control signals 139 based on a multiple path channel estimate 137. In one embodiment, the modulation control module 135 receiving the multiple path channel estimation 137 from another RF transceiver. From this, the modulation control module 135 determines, for each of the plurality of symbol mapping modules, a corresponding one of the plurality of modulation control signals based on a corresponding portion of the multiple path channel estimation. For instance, the modulation control module 135 may receive the multiple path channel estimation 137 as a diagonalized channel (H) based on Eigen beamforming using singular value decomposition, wherein $H=UDV^*$, such that $y=Hx+n=UDV^*x+n$, where U corresponds to the unitary de-beamforming matrix, V corresponds to the unitary beamforming matrix, $V^*$ corresponds to a conjugate of the unitary beamforming matrix, y corresponds to the plurality of streams of frequency domain inbound baseband symbols, x corresponds to the plurality of streams of symbols, and n corresponds to noise.

For a diagonalized channel (H), the modulation control module may determine the corresponding modulation control signals for a 2×N multiple input multiple output (MIMO) wireless communication by first setting $z=Vx$, where V corresponds to the unitary beamforming matrix and x corresponds to the plurality of streams of symbols. The modulation control module 135 then determines a conjugate of the unitary de-beamforming matrix multiplied by the plurality of streams of frequency domain inbound baseband symbols such that $U^*y=U^*UDV^*Vz+U^*n=Dz+N$, where D corresponds to a diagonal matrix of D=[$s_1$ 0; 0 $s_2$] and N corresponds to a noise power, and where $s_1$ and $s_2$ represent first and second signal components. The matrix D is referred to herein as the "transmit path quality matrix" because it represents the quality of the channel with respect to each signal path considered. In various embodiments, $s_1$ and $s_2$ represent first and second signal components, where a signal component may be a signal representation of a subcarrier of a transmit path, and/or a signal representation of the transmit path.

The modulation control module 135 then determines signal to noise ratio (SNR) for each transmit path of the MIMO wireless communication, where $SNR_1=s_1^2/N_0$, and $SNR_2=s_2^2/N_0$, where the $SNR_1$ represents the SNR for a first transmit path of the MIMO wireless communication and the $SNR_2$ represents the SNR for a second transmit path of the MIMO wireless communication. The modulation control module 135 then determines the corresponding modulated control signals based on at least one of the $SNR_1$ and the $SNR_2$. For example, for a first transmit path, if the SNR is between a first and second threshold (e.g., between 75 dB and 90 dB) a modulation scheme of 64 QAM may be used and, for a second transmit path, if the SNR is between a different set of thresholds (e.g., 60 dB and 74 dB), a modulation scheme of 16 QAM may be used. As a further example, the modulation control module 135 may determine the SNR for subcarriers of each transmit path and determine the modulation scheme for each subcarrier based on the SNR.

As another example, the modulation control module 135 may determine the corresponding modulated control signals by first determining a geometric mean for the SNR (SNRgeo) for each of the transmit paths of the MIMO wireless communication over subcarriers of an OFDM (orthogonal frequency division multiplex) frame of the MIMO wireless communication, where $SNRgeo=prod(1+SNRi)^{(1(N-1))}$. The modulation control module 135 then determines assigned bits (b) for the each of the transmit paths based on an Aslanis formula, where $b=\log_2(1+SNR/G)$, where G corresponds to margin such that $b_1<=\log_2(1+SNRgeo_1/G_1)$ and $b_2<=\log_2(1+SNRgeo_2/G_2)$. The modulation control module 135 then relates, or corresponds, the assigned bits for the each of the transmit paths to a modulation convention to produce the corresponding one of the plurality of modulation control signals.

As an extension of the preceding example, the modulation control module 135 may perform the corresponding of the assigned bits for the each of the transmit paths to a modulation convention by first limiting one of the assigned bits in accordance with $b_i=floor(\log_2(1+SNRgeo_i/G_i)/2)*2$ such that a maximum $b_i$ includes 8 bits/tone/stream. The modulation control module 135 then sets a margin (G) to 0 dB. The modulation control module 135 then equates assigned bits $b_i$ of 2 to a 4 QAM (quadrature amplitude modulation) modulation convention, assigned bits $b_i$ of 4 to a 16 QAM modulation convention, assigned bits $b_i$ of 6 to a 64 QAM modulation convention, and assigned bits $b_i$ of 8 to a 256 QAM modulation convention.

In one embodiment, the modulation control module 135 generates the modulation control signals as part of the mode select signal 102 to include, but not limited to, a code rate, a number of coded bits per subcarrier (NBPSC), coded bits per OFDM symbol (NCBPS), and/or data bits per OFDM symbol (NDBPS).

Figure 5:
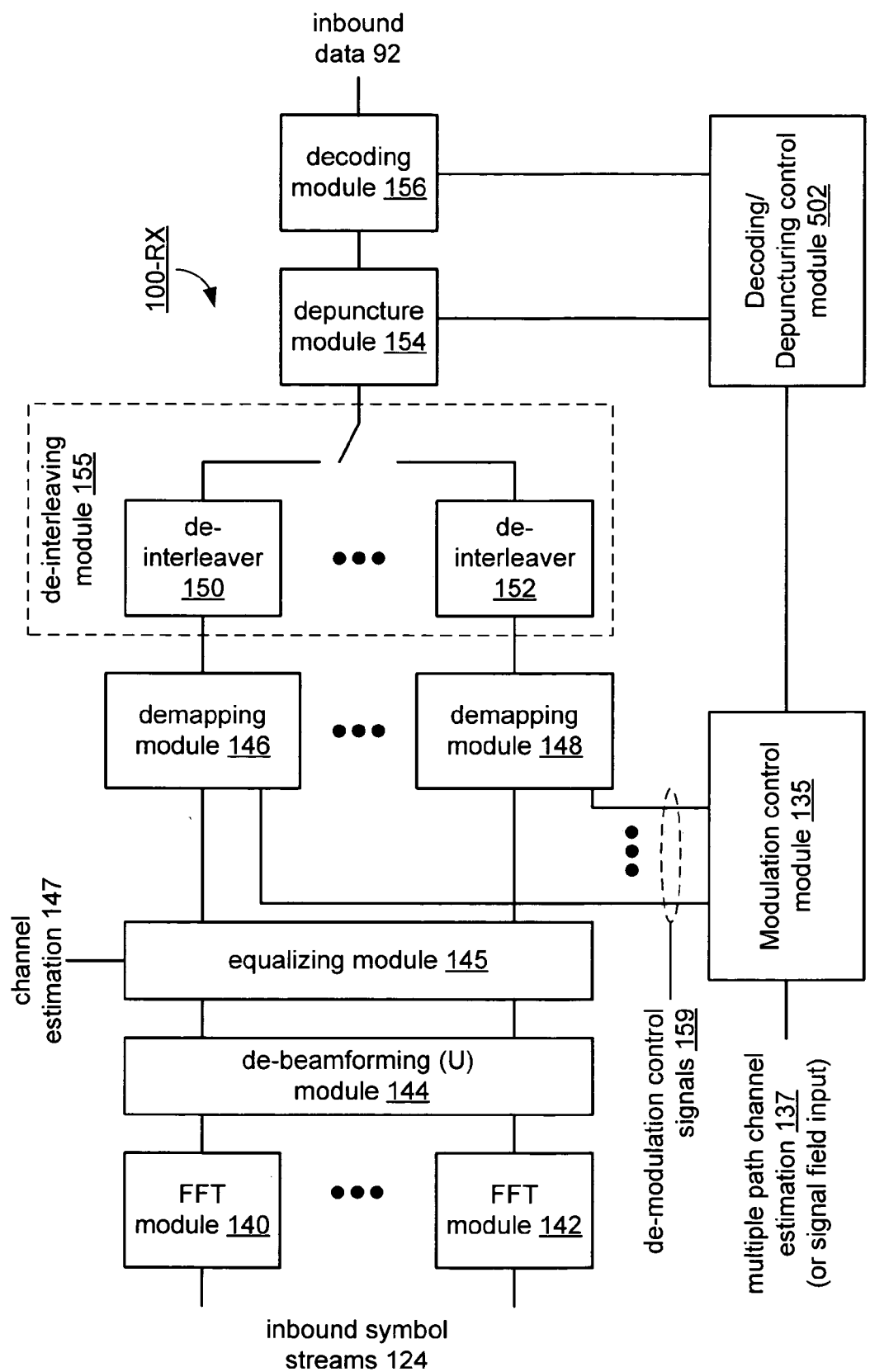
FIG. 5 is a schematic block diagram illustrating baseband receive processing in accordance with the present invention.

FIG. 5 is a schematic block diagram of baseband receive processing 100-RX that includes a plurality of fast Fourier transform (FFT) modules 140, 142, a de-beamforming (U) module 144, an equalizing module 145, a plurality of demapping modules 146, 148, a deinterleaving module 155, a depuncture module 154, and a decoding module 156 for converting a plurality of inbound symbol streams 124 into inbound data 92. In one embodiment, the deinterleaving module 155 includes a switching module and a plurality of deinterleavers 150, 152. As one of ordinary skill in the art will appreciate, the baseband receive processing 100-RX may include two or more of each of the deinterleavers 150, 152, the demapping modules 146, 148, and the FFT modules 140, 142, where the number of each module corresponds to the number of receive paths (e.g., receiver antennas) in a MIMO wireless communication. In addition, one of ordinary skill in art will further appreciate that the decoding module 156, depuncture module 154, the deinterleavers 150, 152, the decoding modules 146, 148, and the FFT modules 140, 142 may be function in accordance with one or more wireless communication standards including, but not limited to, IEEE 802.11a, b, g, n.

In an embodiment, a plurality of FFT modules 140, 142 is operably coupled to convert a plurality of inbound symbol streams 124 into a plurality of streams of frequency domain inbound symbols. The de-beamforming module 144 is operably coupled to inverse beamform, using a unitary matrix having polar coordinates, the plurality of streams of beamformed symbols into a plurality of streams of de-beamformed inbound symbols. The equalizing module 145 is operably coupled to equalize the plurality of streams of de-beamformed inbound baseband symbols in accordance with a channel estimation 147 to produce a plurality of streams of equalized de-beamformed inbound baseband symbols. The channel estimation 147 may be derived using one or more of a plurality of known methods for determining a channel response.

The plurality of demapping modules 146, 148 is operably coupled to demap plurality of streams of equalized de-beamformed inbound baseband symbols in accordance with a plurality of demodulation signals 159 to produce a plurality of streams of inbound baseband signals. The deinterleaver 150, 152 are operably coupled to deinterleave the plurality of inbound baseband signals to produce demodulated inbound baseband signals. The decoding module 156 is operably coupled to convert the demodulated inbound baseband signals into inbound data 92. A decoding/depuncturing control module 502, working in cooperation with the modulation control module 135 controls the manner in which the depuncturing module 154 and decoding module 156 perform decoding operations.

In an embodiment, the beamforming module 144 is operably coupled to multiply a beamforming unitary matrix (U) with baseband signals provided by the plurality of FFT modules 140, 142. The beamforming unitary matrix U used by the beamforming module 144 satisfies the conditions of "U*U=UU*="I", where "I" is an identity matrix of [1 0; 0 1] for 2×2 MIMO wireless communication, is [1 0 0; 0 1 0; 0 0 1] for 3×3 MIMO wireless communication, or is [1 0 0 0; 0 1 0 0; 0 0 1 0; 0 0 0 1] for 4×4 MIMO wireless communication. In this equation, U*U means "conjugate (U) times U" and UU* means "U times conjugate (U)". Note that U may be a 2×2 unitary matrix for a 2×2 MIMO wireless communication, a 3×3 unitary matrix for a 3×3 MIMO wireless communication, and a 4×4 unitary matrix for a 4×4 MIMO wireless communication. Further note that for each column, U includes a first row of polar coordinates including real values as references and a second row of polar coordinates including phase shift values. Of course, U may also be expressed by Cartesian coordinates.

In an embodiment, the FFT modules 140, 142 function in accordance with one of the IEEE 802.11x standards to provide an OFDM (Orthogonal Frequency Domain Multiplexing) frequency domain baseband signals that includes a plurality of tones, or subcarriers, for carrying data. Each of the data carrying tones represents a symbol mapped to a point on a modulation dependent constellation map.

The modulation control module 135 is operably coupled to generate the demodulation control signals 159 based on multiple channel path estimation. In one embodiment, the modulation control module 135 generates the plurality of demodulation control signals by interpreting a signal field of a frame received from another RF transceiver. The structure of this signal field will be described further with reference to FIG. 9.

Figure 6:
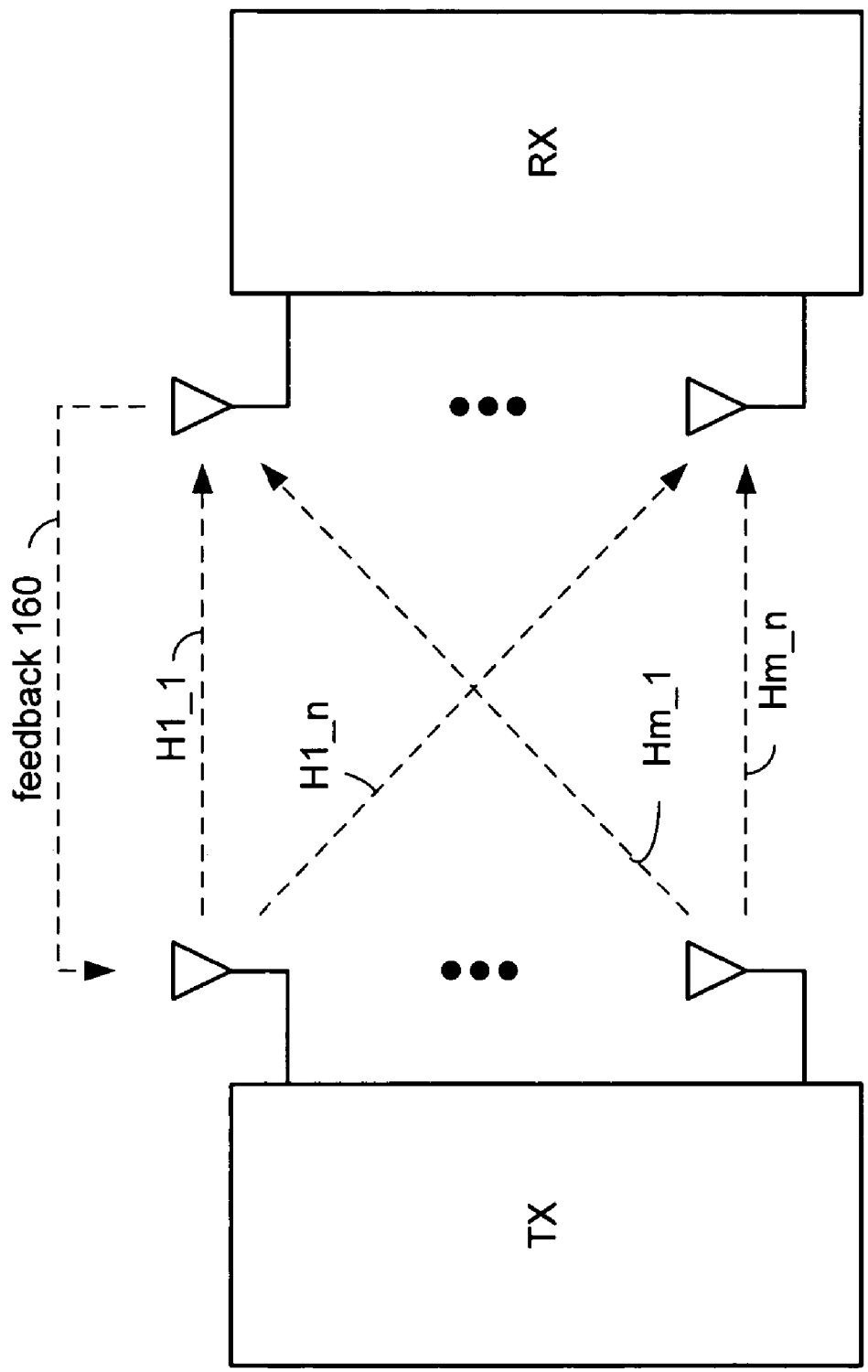
FIG. 6 is a schematic block diagram illustrating a MIMO wireless communication between a transmitting MIMO wireless device (TX) and a receiving MIMO wireless device (RX)

FIG. 6 is a schematic block diagram illustrating a MIMO wireless communication between a transmitting MIMO wireless device (TX) and a receiving MIMO wireless device (RX). In this illustration, the MIMO wireless communication is an M by N MIMO wireless communication (i.e., the transmitter includes M transmit antennas and N receiver antennas. M is equal to N in some embodiments and different from N in other embodiments. The multiple path channel may be represented as a matrix (H), which is a function of the individual channel paths $H1\_1$, $H1\_n$, $Hm\_1$, $Hm\_n$. The receiver RX may calculate the multiple path channel matrix H based on the equation $H=UDV^*$ (H—represents the channel, U is the receiver de-beamforming unitary matrix, and $V^*$ is the conjugate of the transmitter beamforming unitary matrix). With $H=UDV^*$, y (the received signal)=$Hx+N$, where x represents the transmitted signals and N represents noise. If $z=Vx$, then $U^*y=U^*UDV^*Vz+U^*n=Dz+N$, where D represents a transmit path quality matrix and corresponds to a diagonal matrix of $D=[s_1\ 0;0\ s_2]$ (in a 2×M MIMO system) and N corresponds to a noise power, and where $s_1$ and $s_2$ represent first and second signal components of the 2×M MIMO system. In various embodiments, $s_1$ and $s_2$ represent first and second signal components, where a signal component may be a signal representation of a subcarrier of a transmit path, and/or a signal representation of the transmit path, itself, depending upon how these elements are computed. In non 2×2 systems, the dimensions of D differ.

Figure 7:
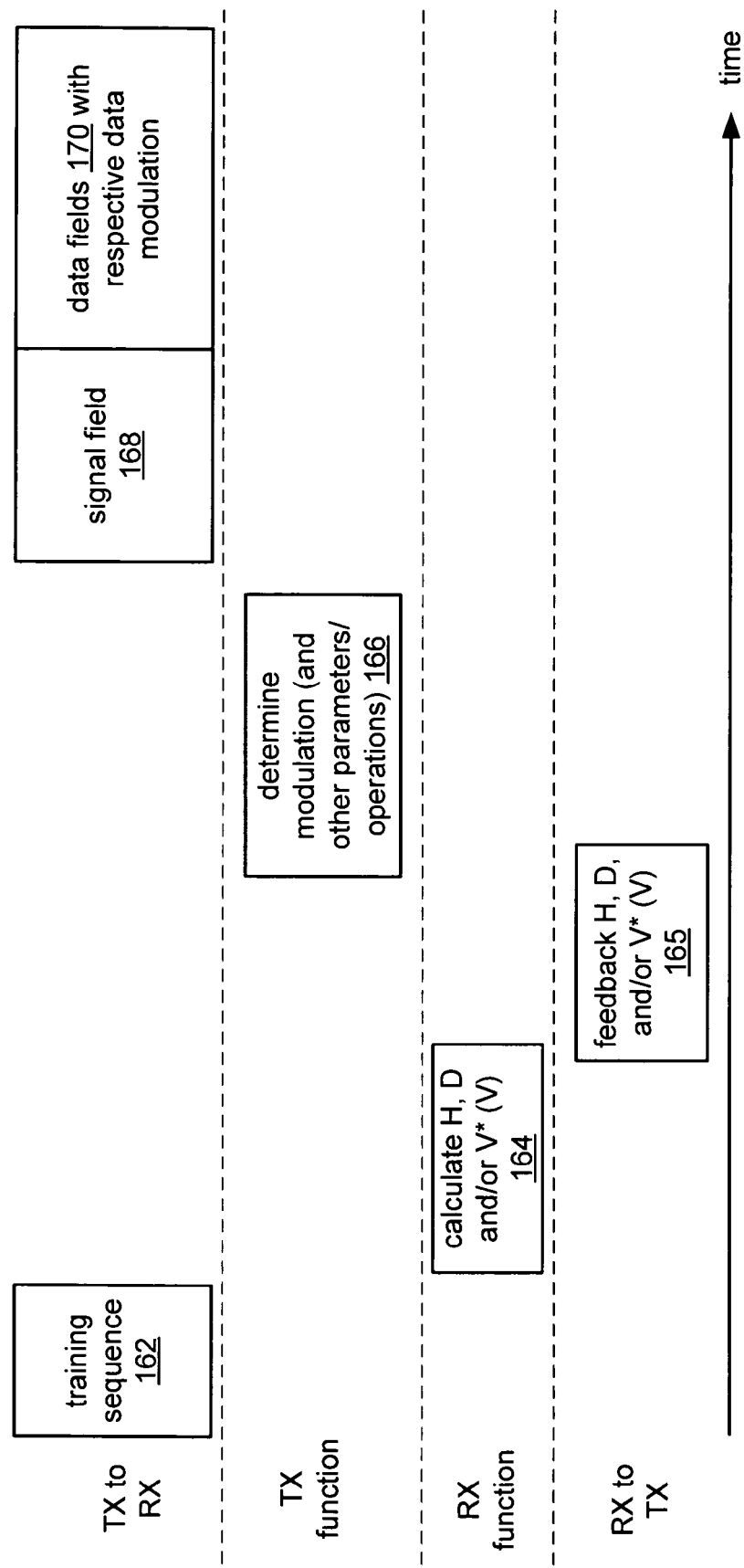
FIG. 7 is a diagram illustrating a first embodiment of operation for channel sounding and data frame formation according to the present invention.

FIG. 7 is a diagram illustrating a first embodiment of operation for channel sounding and data frame formation according to the present invention. Operation begins with a transmitting MIMO wireless device transmitting a training sequence to a receiving MIMO wireless device (step 162). The training sequence may be in accordance with one or more wireless communication standards (e.g., IEEE 802.11a, b, g, n, etc.). With such embodiment(s), the training sequence may include a training sequence component for each of a plurality of data streams with each training sequence component includes a group of training symbols for each tone of a servicing Orthogonal Frequency Division Multiplexed (OFDM) tone group of the data stream. As is generally known, IEEE 802.11a, IEEE 802.11g, and IEEE 802.1 In employ such OFDM modulation scheme(s) with which such a training sequence construct may be employed.

With the embodiment of FIG. 7, the transmitting MIMO wireless device determines modulation parameters for data frames to be transmitted to the receiving MIMO wireless device based upon information fed back from the receiving MIMO wireless device. The information fed back from the receiving MIMO wireless device to the transmitting MIMO wireless device differs with differing operations of FIG. 7.

According to first feedback operations of the embodiment of FIG. 7, after receiving the training sequence from a transmitting MIMO wireless device (step 162), the receiving MIMO wireless device estimates a channel response (H) based upon the training sequence. Further at step 162, the receiving MIMO wireless device determines an estimated transmitter beamforming unitary matrix (V) and a transmit path quality matrix (D) based upon the channel response (H) and a receiver beamforming unitary matrix (U). The receiving MIMO wireless device then transmits to the transmitting MIMO wireless device components of the estimated transmitter beamforming unitary matrix (V) and transmit path quality components that are based upon (or components of) the transmit path quality matrix (D) (step 160). The transmitting MIMO wireless device receives these components and determines a modulation to be employed for each of a plurality of data streams based upon these components (step 166). The components of the estimated transmitter beamforming unitary matrix (V) may optionally be used by the transmitting MIMO wireless device in subsequent beamforming operations.

According to second feedback operations of the embodiment of FIG. 7, the receiving MIMO wireless device sends components of the channel response (H) to the transmitting MIMO wireless device. The transmitting MIMO wireless device then determines a transmit path quality matrix (D) and may also estimate the beamforming unitary matrix (V) based upon the channel response (H) and a known receiver beamforming unitary matrix (U). The beamforming unitary matrix (U) components may be fed back from the receiving MIMO wireless device or have been previously obtained by the transmitting MIMO wireless device. Based upon components of the transmit path quality matrix (D), the transmitting MIMO wireless device then determines a modulation to be employed for each of a plurality of data streams (step 166).

The MIMO wireless device (transmitting or receiving based upon the particular operations) that determines (V) and (D) from (H) and (U) may employ Singular Value Decomposition (SVD) operations to extract components (V) and (D) from the channel response (H) based upon (U). Further, this MIMO wireless device may determine the transmit path quality components by determining a signal to noise ratio (SNR) for each transmit path of the training sequence based upon the transmit path quality matrix (D). In determining the signal to noise ratio (SNR) for each transmit path of the training sequence based upon the transmit path quality matrix (D), the receiving MIMO wireless device may determine a geometric mean for the SNR (SNRgeo) for each of the transmit paths of the training sequence over sub carriers of an OFDM (orthogonal frequency division multiplex) frame of the training sequence, where SNRgeo=prod(1+SNRi)1/N−1.

With the operations of step 166 completed, the transmitting MIMO wireless device transmits a data frame to the receiving MIMO wireless device. The data frame includes a short training sequence, a long training sequence, a signal field with demodulation control signals (step 168), and a data payload for each of multiple data streams (step 170). According to one embodiment of the signal field, the signal field indicates a number of data streams of the data frame and a respective modulation employed for each data stream. The signal field may include additional information, as is described further below with reference to FIGS. 9 and 10.

Figure 8:
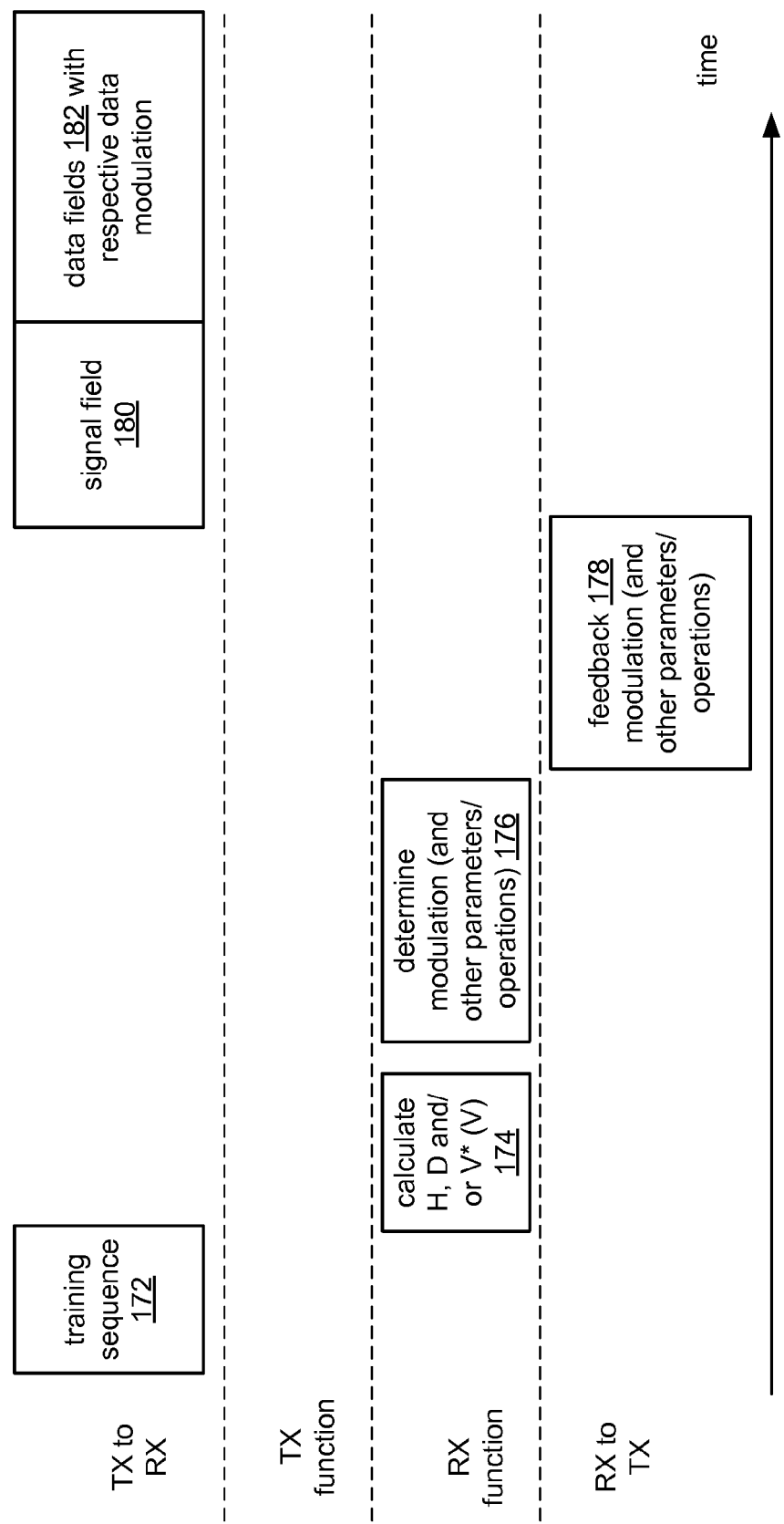
FIG. 8 is a diagram illustrating a second embodiment of operation for channel sounding and data frame formation according to the present invention.

FIG. 8 is a diagram illustrating a second embodiment of operation for channel sounding and data frame formation according to the present invention. Some operations of FIG. 8 are similar to or equivalent to corresponding operations of FIG. 7 and are not described separately in detail with reference to FIG. 8. As contrasted to the operations of FIG. 7, with the operations of FIG. 8, the receiving MIMO wireless device selects modulations to be employed for the plurality of data streams by the transmitting MIMO wireless device. Thus, with the operations of FIG. 8, the receiving MIMO wireless device receives a training sequence from a transmitting MIMO wireless device (step 172). The receiving MIMO wireless device then estimates a channel response (H) based upon the training sequence and then determines an estimated transmitter beamforming unitary matrix (V) and a transmit path quality matrix (D) based upon the channel response (H) and a receiver beamforming unitary matrix (U) (step 174). The receiving MIMO wireless device then determines a modulation to be employed for each of a plurality of data streams by the transmitting MIMO wireless device based upon components of the transmit path quality matrix (D) (step 176). The manner in which H, V, and D are determined is the same/similar as was described above as determined by the transmitting MIMO wireless device.

The receiving MIMO wireless device then feeds back an indication of the modulation to be employed for each of the plurality of data streams by the transmitting MIMO wireless device (step 178). In response to receiving the indication (step 178), the transmitting MIMO wireless device transmits a data frame to the receiving MIMO wireless device that includes a short training sequence, a long training sequence, a signal field (step 180), and a data payload for each data stream, each data payload modulated according to a respective indication received from the receiving wireless device (step 182). The signal field may further indicate the number of data streams of the data frame and the modulation employed for each data stream and/or whether beamforming is employed by the transmitting MIMO wireless device. Moreover, the signal field may further include indications that are further described with reference to FIGS. 9 and 10 below.

Figure 9:
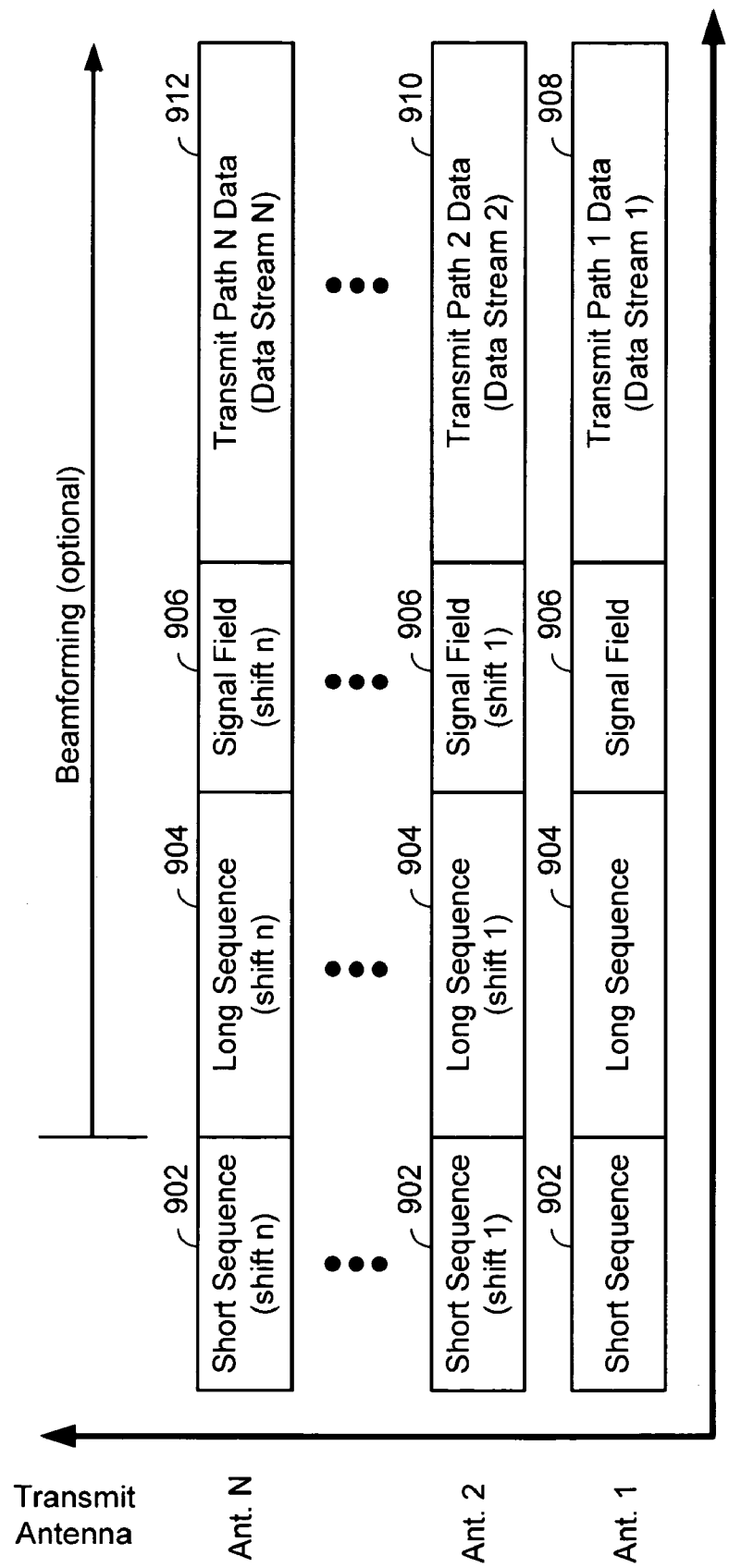
FIG. 9 is a diagram illustrating structure of data frames constructed according to embodiments of the present invention.

FIG. 9 is a diagram illustrating structure of data frames constructed according to embodiments of the present invention. As is shown, data frames (1-N) are transmitted via a respective plurality transmit antennas (1-N) of a transmitting MIMO wireless device. Generally, each transmit antenna services a corresponding data stream and data transmitted via each transmit antenna corresponds to a unique transmit path. Each data frame includes a short training sequence, a long training sequence, a signal field, and a data payload. Note that the short training sequence 902, the long training sequence 904, and the signal field 906 are redundant among the data frames (1-N) while the data payloads (1-N) 908, 910, . . . 912 are unique to the plurality of data streams. However, the copies of the short training sequence 902, the long training sequence 904, and the signal field 906 are shifted with respect to one another. With one operation, beamforming is optionally applied beginning with the long training sequence 904.

FIG. 10 is a block diagram illustrating one embodiment of a signal field constructed according to an embodiment of the present invention. According to various embodiments of the signal field, the signal field includes one or more of a Configuration field 952, a CONs field 954, a LEN field 956, a LPI field 958, a Clsd field 960, a Reserved field 962, a Cyclical Redundancy Check (CRC) field 964, and a Tail 966. With the embodiment of FIG. 10, the Configuration Field 952 indicates a number data streams included in the data frame, a number of TX antennas employed by the transmitting MIMO wireless device, a bandwidth employed by the transmitting MIMO wireless device, e.g., 20 MHz or 40 MHz, a coding rate employed for the data payload(s), e.g., 1/2, 2/3, 3/4, 5/6, 7/8, etc., and a coding technique employed for the data payload(s) the data frame, e.g., Convolutional Coding, Low Density Parity Check (LDPC) coding, etc.

The CONs field 954 indicates a modulation employed for each data stream (data payload) of the data frame, e.g., BPSK, 16 QAM, 64 QAM, 256 QAM, etc. The Clsd field 960 indicates whether closed loop beamforming is employed fro the data frame. The LEN field 956 indicates the packet length of the data payloads 908-912, e.g., up to $2^{13}$ bytes. The LPI field 958 indicates whether the current data frame is the last data frame of a plurality of data frames to be aggregated. The signal field 906 could further indicate whether spatial division multiplexing is employed for the data frame and/or whether space time block coding is employed for the data frame. Of course, the signal field 906 could include additional/other information as well.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for optimizing data throughput of a MIMO wireless communication. As one of average skill in the art will appreciate, other embodiments may be derived from the present teachings without deviating from the scope of the claims. For instance, adaptive modulations using SVD (singular value decomposition) enables the assigning of more bits on better space mode channels and less bits on worse space mode channels such that the probability of wrong detection of signals is reduced, thereby increasing margin. Note that in one embodiment, the first singular value is greater than the second singular value and, as such, the transmission through the first space mode is more reliable than through the second space mode.

What is claimed is:

1. A method for operating a receiving Multiple Input Multiple Output (MIMO) wireless device comprising:
receiving a training sequence from a transmitting MIMO wireless device;
estimating a channel response (H) based upon the training sequence;
determining an estimated transmitter beamforming unitary matrix (V) and a transmit path quality matrix (D) based upon the channel response (H) and a receiver beamforming unitary matrix (U);
determining transmit path quality components by determining a signal to noise ratio (SNR) for each transmit path of the training sequence based upon the transmit path quality matrix (D), comprising determining a geometric mean for the SNR (SNRgeo) for each of the transmit paths of the training sequence over sub carriers of an OFDM (orthogonal frequency division multiplex) frame of the training sequence, where SNRgeo=prod(1+SNRi)1/N−1, where SNRi is the signal to noise ratio of the $i^{th}$ transmit path, and N is a noise power;

sending components of the estimated transmitter beamforming unitary matrix (V) and the signal to noise ratio (SNR) components determined based upon the transmit path quality matrix (D) to the transmitting MIMO wireless device; and receiving a data frame from the transmitting MIMO wireless device, wherein the data frame comprises:
a short training sequence;
a long training sequence;
a signal field indicative of a modulation employed for each data stream of a plurality of data streams; and
a data payload for each data stream.

2. The method of claim 1, wherein the signal field further indicates whether beamforming is employed by the transmitting MIMO wireless device.

3. The method of claim 1, wherein the signal field further indicates at least one of:
a number of the plurality of data streams;
a number of transmit antennas employed for the data frame;
a signal bandwidth of the data frame;
a coding rate employed for each data stream;
a coding technique employed for each data stream;
whether spatial division multiplexing is employed for the data frame; and
whether space time block coding is employed for the data frame.

4. The method of claim 1, wherein:
the training sequence includes a training sequence component for each data stream; and
each training sequence component includes a group of training symbols for each tone of a servicing Orthogonal Frequency Division Multiplexed (OFDM) tone group of the data stream.

5. The method of claim 1, wherein the channel response (H), estimated transmitter beamforming unitary matrix (V), and the receiver beamforming unitary matrix (U) are related by the equation:

$$H=UDV^*$$

where, V* is the complex conjugate of the estimated transmitter beamforming unitary matrix (V); and
D is the transmit path quality matrix.

6. The method of claim 1, wherein determining the estimated transmitter beamforming unitary matrix (V) and the transmit path quality matrix (D) based upon the channel response and the receiver beamforming unitary matrix (U) comprises performing Singular Value Decomposition (SVD) operations.

7. A method for operating a receiving Multiple Input Multiple Output (MIMO) wireless device comprising:
receiving a training sequence from a transmitting MIMO wireless device;
estimating a channel response (H) based upon the training sequence;
determining an estimated transmitter beamforming unitary matrix (V) and a transmit path quality matrix (D) based upon the channel response (H) and a receiver beamforming unitary matrix (U), by determining a signal to noise ratio (SNR) for each transmit path of the training sequence, including determining a geometric mean (SNRgeo) for each of the transmit paths of the training sequence over sub carriers of an OFDM (orthogonal frequency division multiplex) frame of the training sequence, where SNRgeo=prod(1+SNRi) 1/N−1, SNRi is the signal to noise ratio of the $i^{th}$ transmit path, and N is a noise power;

determining a modulation to be employed by each of a plurality of data streams based upon components of the transmit path quality matrix (D);

sending components of the estimated transmitter beamforming unitary matrix (V) and an indication of the modulation to be employed by each of the plurality of data streams to the transmitting MIMO wireless device; and receiving a data frame from the transmitting MIMO wireless device, wherein the data frame comprises:
a short training sequence;
a long training sequence;
at least one of the short training sequence and the long training sequence including a training sequence component for each data stream, each training sequence component including a group of training symbols for each tone of a servicing Orthogonal Frequency Division Multiplexed (OFDM) tone group of the data stream;
a signal field; and
a data payload for each data stream, where each data stream employs a respective modulation indicated to the transmitting MIMO wireless device.

8. The method of claim 7, wherein the signal field further indicates whether beamforming is employed by the transmitting MIMO wireless device.

9. The method of claim 7, wherein the signal field further indicates at least one of:
the number of data streams;
a number of transmit antennas employed for the data frame;
a signal bandwidth of the data frame;
a coding rate employed for each data stream;
a coding technique employed for each data stream;
whether spatial division multiplexing is employed for the data frame; and
whether space time block coding is employed for the data frame.

10. The method of claim 7, wherein the channel response (H), estimated transmitter beamforming unitary matrix (V), and the receiver beamforming unitary matrix (U) are related by the equation:

$$H=UDV^*$$

where, V* is the complex conjugate of the estimated transmitter beamforming unitary matrix (V); and
D is the transmit path quality matrix.

11. A method for operating a transmitting Multiple Input Multiple Output (MIMO) wireless device comprising:
transmitting a training sequence to a receiving MIMO wireless device;
receiving, from the receiving MIMO wireless device, components of a channel response (H) that is based upon the training sequence;
determining a transmit path quality matrix (D) based upon the channel response (H);
determining transmit path quality components by determining a signal to noise ratio (SNR) for each transmit path of the training sequence based upon the transmit path quality matrix (D) by determining a geometric mean for the SNR (SNRgeo) for each of the transmit paths of the training sequence over sub carriers of an OFDM (orthogonal frequency division multiplex) frame of the training sequence, where $SNRgeo = prod(1+SNRi) 1/N-1$, $SNRi$ is the signal to noise ratio of the $i^{th}$ transmit path, and N is a noise power, wherein the transmit path quality components are used to determine the modulation to be employed for each of a plurality of data streams;

transmitting a data frame to the receiving MIMO wireless device, wherein the data frame comprises:
 a short training sequence;
 a long training sequence;
 a signal field indicating both a number of data streams of the data frame and a modulation employed for each data stream; and
 a data payload for each data stream.

12. The method of claim 11, wherein the signal field further indicates whether beamforming is employed by the transmitting MIMO wireless device.

13. The method of claim 11, wherein the signal field further indicates at least one of:
 a number of transmit antennas employed for the data frame;
 a signal bandwidth of the data frame;
 a coding rate employed for each data stream;
 a coding technique employed for each data stream;
 whether spatial division multiplexing is employed for the data frame; and
 whether space time block coding is employed for the data frame.

14. The method of claim 11, wherein:
the training sequence includes a training sequence component for each data stream; and
each training sequence component includes a group of training symbols for each tone of a servicing Orthogonal Frequency Division Multiplexed (OFDM) tone group of the data stream.

* * * * *